May 5, 1953
J. S. ALSPAUGH
2,637,220
TRANSMISSION
Filed June 13, 1951
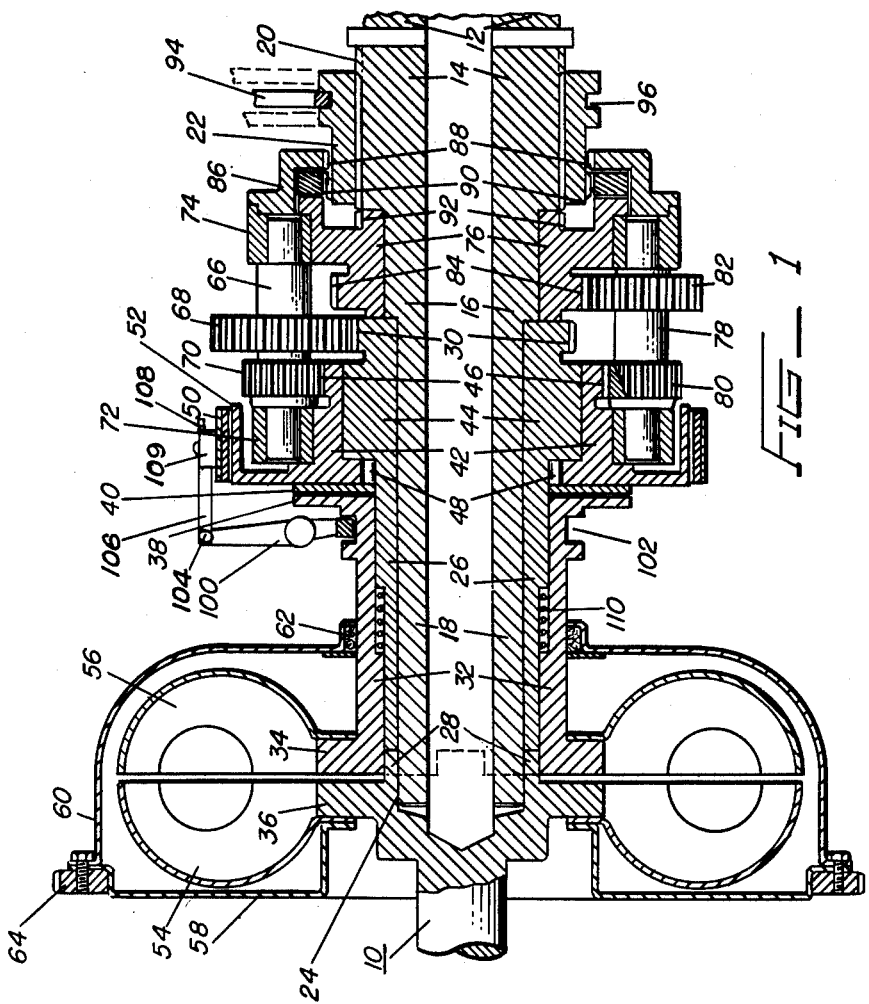
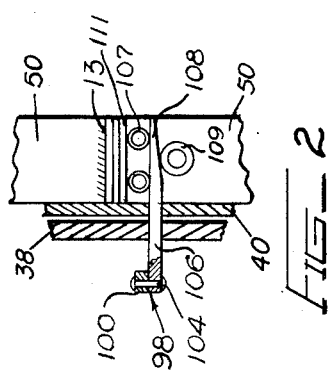
INVENTOR.
JAMES S. ALSPAUGH
BY
McGrady & Wilson
ATTORNEYS Patented May 5, 1953

2,637,220

UNITED STATES PATENT OFFICE 2,637,220

TRANSMISSION

James S. Alspaugh, Portsmouth, Ohio

Application June 13, 1951, Serial No. 231,363

2 Claims. (Cl. 74—688)

This invention relates to transmissions, and more particularly to a mechanical device for transmitting power from a driving shaft to a driven shaft in such manner that the speed ratio of the driven shaft relative to the driving shaft is dependent on the torque applied to the driving shaft with reference to the load to which the driven shaft is subjected.

An object of the invention is to provide an infinitely variable mechanical transmission having driving and driven shafts interconnected by mechanical gearing controlled in such manner that the ratio of speed may vary automatically in accordance with variations in the torque and load to which the driving and driven shafts are subjected.

Another object of the invention is to provide a transmission having a reaction member adapted to be controlled by the speed and fluid operating characteristics of a fluid coupling driven by a driving member and adapted to be controllably clutched to the reaction member of the transmission.

A further object of the invention is to provide a mechanical transmission including a fluid clutch and including aligned driving and driven shafts interconnected by planetary gearing which is rotatably mounted in a frame adapted to be controlled by the driven member of the fluid clutch, the frame being controlled by said clutch in such manner that it may move relative to a stationary member to vary the torque and speed ratios of the driving and driven shafts.

Still another object of the invention resides in the provision of a transmission having gear-connected shafts wherein means are provided for controlling the speed of rotation of the gear carriers and gears to vary the torque transmitting characteristics of the transmission.

Yet a further object of the invention is to provide a control mechanism for the reaction member of a transmission wherein speed responsive means are employed to progressively clutch the reaction member to a driving member when a forward drive is provided, and means are employed to release the clutch when the reaction member is restrained from rotation by a brake to effect a reverse drive.

Further objects and advantages of the invention will be apparent from the following description, taken in connection with the appended drawing, wherein:

Fig. 1 is a longitudinal sectional view of a transmission embodying the invention; and Fig. 2 is a view of a control mechanism for releasing a reaction member holding brake as a clutch is engaged to connect the reaction member to a driving member and vice versa.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the transmission illustrated in Fig. 1, the power or driving shaft 10 is adapted to be connected to any suitable source of power, such as the engine of an automotive vehicle. Aligned with the driving shaft 10 is a final hollow driven shaft 12, which may be connected through a differential, not shown, to the driving wheels of the vehicle. The driven shaft 12 has an enlarged rear section 14, a section 16 of intermediate diameter, and a forward section 18 of reduced diameter. The enlarged rear section 14 has axially extending splines 20 adapted to receive a sleeve 22 having internal splines adapted to engage the splines 20 formed on the enlarged section 14 of the driven shaft 12. The forward section 18 of the driven shaft 12 is journalled in the driving shaft 10 as illustrated at 24 to provide a more rigid construction and to maintain alignment between the front and rear sections of the transmission.

Rotatably mounted on the forward section 18 of the driven shaft 12 is a sleeve 26 secured at its forward end by means of clutch teeth 28 to the driving shaft 10, the latter being formed with corresponding dental teeth which engage the teeth 28 to form a permanent connection between the two members. At its rear end the sleeve 26 has a driving sun gear 30 for a purpose hereinafter explained.

Rotatable on the sleeve 26 is another sleeve 32, formed at its forward end with a flange 34 which matches a similar flange 36 formed on the power shaft 10. The rear end of the sleeve 32 is formed with a radially extended clutch disk 38 adapted to be moved axially into driving engagement with a clutch disk 40 carried by a member 42 rotatably mounted on an enlarged portion 44 of the sleeve 26 and having a controlled sun gear 46 spaced from the sun gear 30 driven by the driving shaft 10. The member 42 having the controlled sun gear 46 is rotatably mounted on the sleeve 26 through a bearing 48 in such a manner that it may be restrained against rotation by a brake band 50 adapted to engage a drum 52 carried by the member 42. The member 42 having the controlled sun gear 46 may also be progressively clutched to the sleeve 26 and driving shaft 10 by the clutch 38—40.

Means are provided to control the speed of rotation of the sleeve 32 and controlled sun gear 46. One illustrative example of such means consists of a fluid coupling interposed between the driving shaft 10 and the sleeve 32. Secured to the flanges 36 and 34 of the driving shaft 10 and sleeve 32 respectively are the impeller element 54 and the turbine element 56 of the fluid coupling of known type, which acts in the known manner to exert a torque upon the sleeve 32 proportionate to the speed of the engine and to the load upon the turbine element.

Secured to the flange 36 is a housing for the fluid clutch, made up of a plate 58 and a housing 60 which has an oil seal 62 rotatably engaging the sleeve 32. A flywheel 64 may be secured to the periphery of plate 58, to be engaged by the engine starter in the usual manner. The entire mechanism may be enclosed within a protective casing in a known manner.

A set of pinion shafts 66 having pinion gears 68 and 70 meshing with the driving sun gear 30 and the controlled sun gear 46 respectively are journalled at opposite ends in front and rear carriers 72 and 74. The front carrier 72 is journalled on the member 42 and the rear carrier 74 is journalled on a member 76 rotatably mounted on the intermediate section 16 of the driven shaft 12.

A second set of pinion shafts 78 have pinion gears 80 and 82 meshing with the controlled sun gear 46 and with a sun gear 84 carried by the member 76 respectively. The pinion shafts 78 are journalled at opposite ends in the front and rear carriers 72 and 74.

The rear carrier 74 is provided with a member 86 having internal teeth 88 adapted to be engaged by an externally toothed member 90 carried by the sleeve 22 splined to the final driven shaft 12 when a reverse drive is desired. The member 76 has external clutch teeth 92 adapted to be engaged by the internal splines of the sleeve 22 when a forward drive is desired. A shifter fork 94 engaging in a groove 96 of the sleeve 22 may be actuated in any desired manner to shift the sleeve 22 into engagement with the member 76 to provide a forward drive, or into engagement with the internal teeth 88 of the member 86 to provide a reverse drive.

The apparatus for actuating the clutch 38—40 and the brake 50—52 for controlling the member 42 and sun gear 46 is illustrated schematically in Fig. 2, which shows the parts in the neutral position at which time both the clutch and brake are released. It will be noted that a toggle linkage 98 consists of a lever 100 projecting into a groove 102 in the sleeve 32. The lever 100 is pivoted at 104 to another lever 106 having a cam surface 108 adapted to slide between spaced rollers 107 and 109. The pivot on which the roller 109 is mounted is fixed and the pivots on which the rollers 107 are mounted move relative to the roller 109 to shift the movable and fixed flanges 111 and 113 of the brake band 50 toward and away from each other to engage or release the brake 50—52 as the sleeve 32 is shifted axially to respectively release or engage the clutch 38—40.

The operation of my improved transmission is as follows: Assume that the vehicle is stationary, the driven shaft 12 also being stationary, and that the engine of the vehicle is running at idling speed. The driving shaft 10 and the impeller 54 of the fluid coupling will be rotating slowly. If forward drive is desired the shifter fork 94 is moved to engage the internal splines of the sleeve 22 with the external teeth 92 of the member 76. The driving shaft 10 is rotating in the forward direction and the sleeve 32 under the influence of the reaction of the planetary gears, is rotating in the opposite direction, so that the gear 82 is rolling around the periphery of sun gear 84. In order to drive the vehicle in the forward direction the operator speeds up the engine whereupon the impeller 54 of the fluid coupling energizes fluid and throws it outwardly where it is directed into the turbine 56 to impart torque or energy thereto. Since little torque is applied through the fluid coupling at engine idling speeds, the reaction of the planetary gears will cause the sleeve 32 to operate in a reverse direction as above noted, that is, if the driving shaft 10 is rotating in the clockwise direction, as viewed from the left in Fig. 1, the pinion shafts 66 and 78 will rotate about the driven shaft 12 in the counterclockwise direction.

If now the engine is speeded up the fluid leaving the impeller 54 and directed into the turbine 56 causes an axial thrust to be exerted through the flange 34 to shift the sleeve 32 in opposition to the force exerted by a clutch releasing spring 110 to progressively engage the clutch 38—40. As the clutch 38—40 progressively engages the member 42 and the controlled sun gear 46 is subjected to progressively increasing torque which tends to retard the reverse rotation of the controlled sun gear 46 which correspondingly increases the torque exerted on the driven shaft 12. The transmission is then operating at a high reduction ratio, being in effect in low gear. As the vehicle speed increases, or the torque required to turn the driven shaft 12 decreases, the engagement of the clutch 38—40 increases, which further retards the reverse rotation of the controlling sun gear 46, which will further decrease the reduction ratio through the transmission.

Further reduction of the torque required to turn the driven shaft, or further increase in the motor speed, will cause the turbine 56 of the fluid coupling to increase the engagement of the clutch 38—40 whereupon the speed ratio of the transmission is increased to provide the highest speed ratio at which the load can be efficiently carried.

To provide reverse drive the shifter fork 94 is moved rearwardly to engage the external teeth 90 of the sleeve 22 with the internally toothed member 88 of the member 86 fixed to the rear and front carrier members 74—72. Attention is directed to the fact that movement of the shifter fork 94 to the reverse drive position engages the reverse drive brake 50 to brake the controlling sun gear 46, and actuate the toggle linkage 98 to prevent engagement of the clutch 38—40. As the engine is speeded up the pinion gears 70 and 80 roll about the controlled sun gear 46 held by the brake 50, and drive the final driven shaft in the reverse direction through the toothed member 88 of the member 86 which is engaged by the external teeth 90 of the sleeve 22 splined to the final driven shaft 12.

It will be apparent that my improved transmission may be used not only in automobile vehicles but in power hoists and wherever an infinitely variable transmission is desired.

Although the invention has been described with particular reference to one illustrative embodiment thereof, it may be embodied in other forms, and is not limited except by the terms of the following claims.

I claim:
1. In a transmission, a driving shaft, a final driven shaft, a sun gear fixed to the driving shaft, a controlled sun gear, a carrier, pinion gears in the carrier interconnecting the sun gear fixed to the driving shaft and the controlled sun gear, a driven sun gear, pinion gears in the carrier interconnecting the controlled sun gear and the driven sun gear, clutch means to connect the driven sun gear to the final driven shaft, a fluid coupling comprising an impeller driven by the driving shaft and an axially shiftable turbine driven by the impeller, a clutch to connect the controlled sun gear to the turbine, means controlled by an increase of speed of the impeller to engage the clutch to connect the controlled sun gear to the turbine, a brake for the controlled sun gear, means to connect the carrier to the final driven shaft, and means operable by engagement of said clutch to release the brake, and to release the clutch upon engagement of the brake.

2. In a transmission having a driving shaft, a final driven shaft, a sun gear fixed to the driving shaft, planetary gear means between the sun gear fixed to the driving shaft and the final driven shaft, a controlled sun gear, a fluid coupling having an impeller fixed to the driving shaft, a turbine axially shiftable relative to the impeller and adapted to be driven thereby, a clutch between the turbine and the controlled sun gear adapted to progressively drive the controlled sun gear from the turbine as the speed of the turbine increases, a brake for locking the controlled sun gear against rotation, and a toggle linkage between the clutch and brake applying mechanisms to release the brake as the clutch is applied, and to release the clutch as the brake is applied.

JAMES S. ALSPAUGH.

References Cited in the file of this patent
UNITED STATES PATENTS

| Number | Name | Date |
|---|---|---|
| 1,242,974 | Pickney | Oct. 16, 1917 |
| 2,206,859 | Duffield | July 2, 1940 |
| 2,448,249 | Bonham | Aug. 31, 1948 |
| 2,559,922 | Alspaugh | July 10, 1951 |
| 2,561,499 | Cohen | July 24, 1951 |

FOREIGN PATENTS

| Number | Country | Date |
|---|---|---|
| 442,562 | Great Britain | Feb. 11, 1936 |
| 974,187 | France | Feb. 19, 1951 |